United States Patent [19]
Desai et al.

[11] Patent Number: 6,034,746
[45] Date of Patent: Mar. 7, 2000

[54] SYSTEM AND METHOD FOR INSERTING DATA INTO A DIGITAL AUDIO/VIDEO DATA STREAM

[75] Inventors: Prakash Vinodrai Desai, Round Rock; Robert Gordon Nelson, Austin, both of Tex.

[73] Assignee: International Business Machines Corporation, Armonk, N.Y.

[21] Appl. No.: 08/958,077

[22] Filed: Oct. 27, 1997

[51] Int. Cl.[7] ....................................... H04N 7/50
[52] U.S. Cl. .................. 348/845.2; 348/423; 348/705
[58] Field of Search ............................ 348/845.2, 845.3, 348/423, 473, 705; H04N 7/50

[56] References Cited

U.S. PATENT DOCUMENTS 5,917,830  6/1999  Chen ......................................... 348/473

*Primary Examiner*—Howard Britton
*Attorney, Agent, or Firm*—Leslie A. Van Leeuwen; Thomas E Tyson

[57] ABSTRACT

The present invention is a system, method, and computer readable medium for inserting additional data into a digital audio/visual data stream, at points other than pre-defined splice points in the data stream. The inserted data may possess one or more attributes which differ from the original data stream. The distributor of an audio/video asset provides control information, including an insert file, which contains a list of insert points in the data stream. Reinitialization data information is also provided for each insert point. The reinitialization data includes the attribute information needed to reinitialize a decoder with the attributes of the original data stream after the inserted data is played. The original audio/video data stream is played until an insert point is reached. The additional data is then played. Next, the reinitialization data for the insert point is played in order to reinitialize the decoder with the attributes of the original data stream. Finally, the original audio/video data stream is restarted at the insert point. Decoder attributes are thus reset appropriately in order to play the original data stream after the additional data has been played.

44 Claims, 5 Drawing Sheets

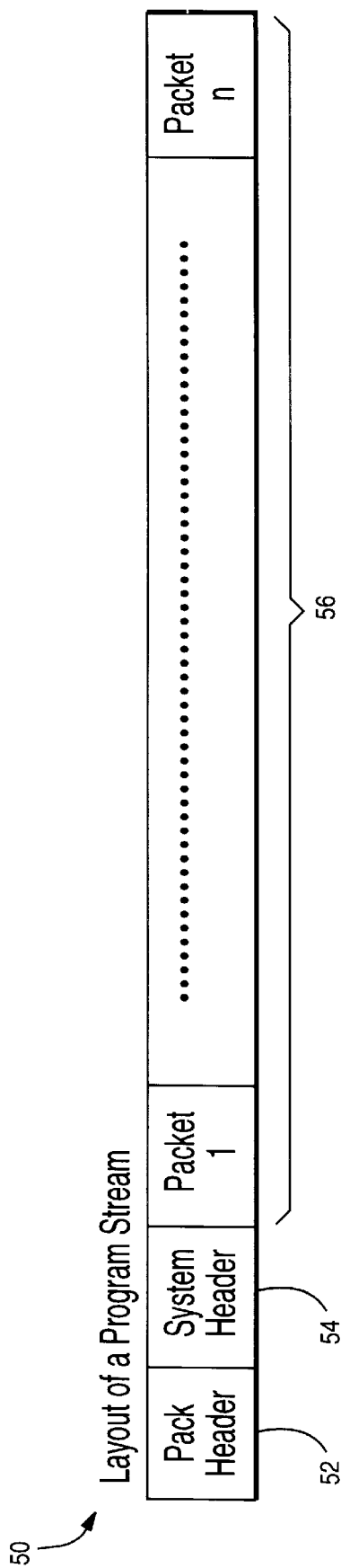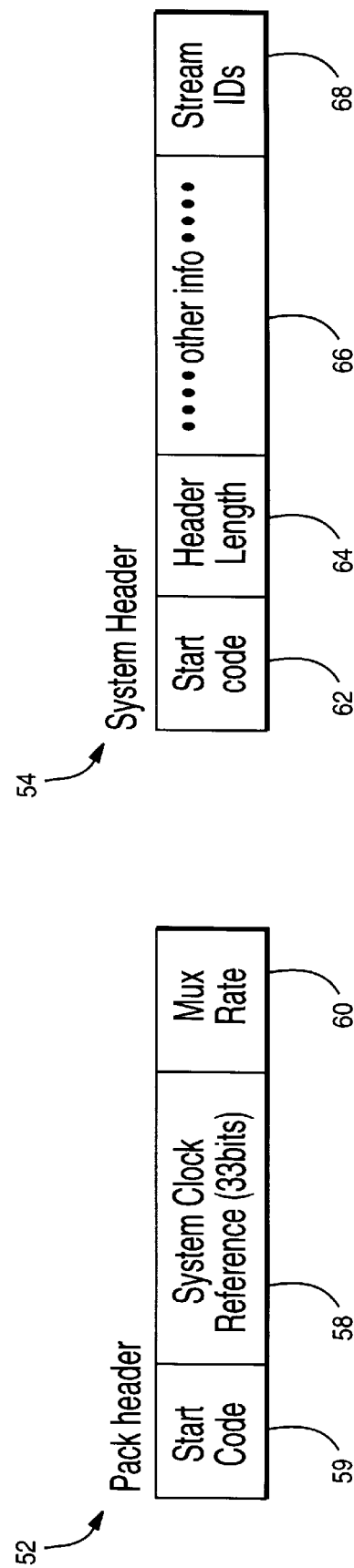

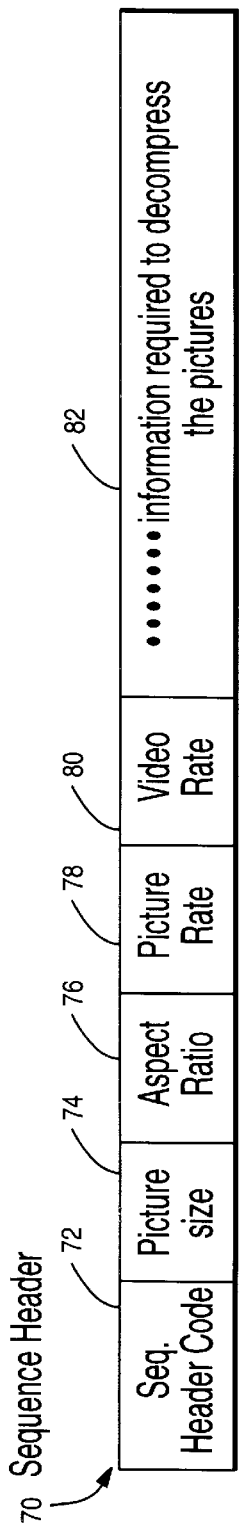
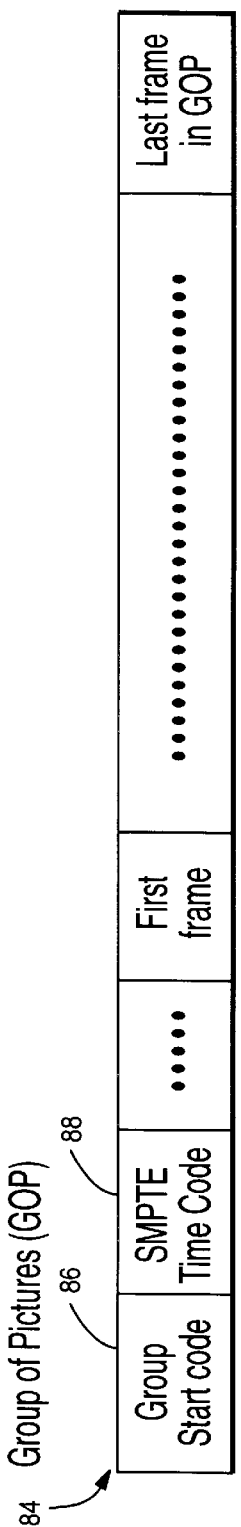
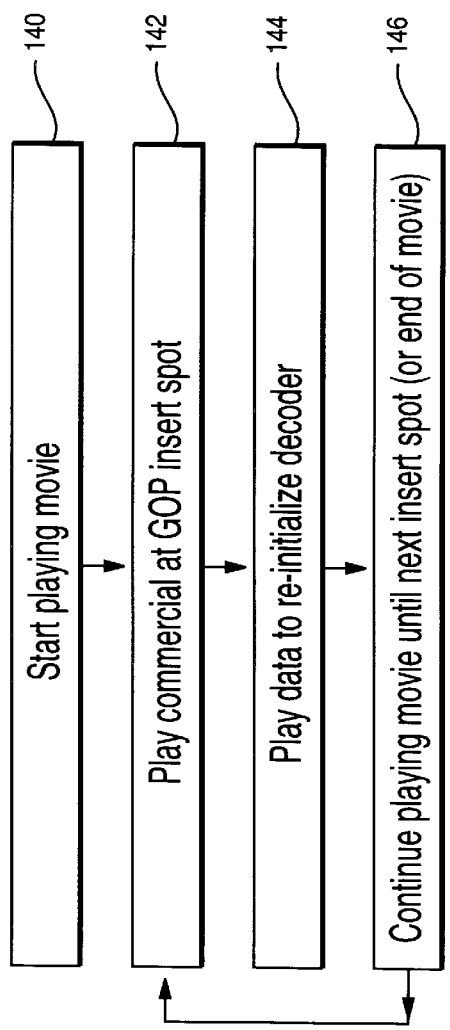

SYSTEM AND METHOD FOR INSERTING DATA INTO A DIGITAL AUDIO/VIDEO DATA STREAM

FIELD OF THE INVENTION

The present invention relates to the field of information handling systems, and, more particularly, to a system and method for inserting additional data into a digital audio/video data stream.

BACKGROUND OF THE INVENTION

Digital signal compression is the process of encoding an analog signal, such as a video or audio signal, into a digital bit stream of "1"s and "0"s. The resulting digitized data may be stored on a compact disk or other storage medium, or may be sent via satellite or cable, or over a network, such as the Internet. During the process of digital signal compression, redundant details are typically eliminated from the analog signal, allowing more data to be sent or stored.

Movies and television programs may be stored and transmitted in digital form. One advantage of storing and transmitting audio and visual information in digital form is that digital data does not become distorted as it is sent. Analog signals may pick up noise as they travel from a transmitter to people's homes. As previously mentioned, digitized movies and television programs may be stored on and played from a storage medium, or may sent via cable, satellite, or a network. It is possible for a user to download audio and visual data, including movies, from a network, such as the Internet.

When digitized data is to be viewed by a user, the digitized data must be converted back to analog audio and visual data. This process is referred to as decoding, and is performed by the decompression portion of a compression/decompression algorithm, referred to as a codec. A codec may be implemented in either hardware or software, although in most personal computers, codecs are implemented in software.

There are a number of compression technologies currently available. The Moving Pictures Experts Group, MPEG, is a group formed under the International Organization for Standardization, ISO, and is charged with the task of creating standards for digital signal compression. These standards are in the form of decoder specifications.

The first standard developed by MPEG was International Standard 11172 (ISO/IEC-11172), known as MPEG-1. MPEG-1 is generally considered to provide quality similar to VHS. It allows for the coding of audio/visual signals at a bit rate of approximately 1.5 megabits per second. The MPEG-1 standard is used in the movie industry for digitizing movies sold to customers on videodiscs. MPEG-1 is also used for transmitting audio and video data over telephone lines, which is how many people currently connect to networks, such as the Internet.

The next standard developed by MPEG was International Standard 13818 (ISO/IEC-13818), known as MPEG-2. MPEG-2 is generally considered to provide higher quality video at a faster bit rate of approximately 6 megabits per second. Users of the MPEG-2 standard include cable television companies, which provide cable television systems with hundreds of channels. MPEG-2 is a superset of MPEG-1, therefore an MPEG-2 codec is able to decode both MPEG-1 and MPEG-2 data.

The MPEG-1 specification defines a single system stream format, known as Systems Multiplex (SM). The MPEG-2 specification defines two system stream formats, known as the Program Stream (PS) and the Transport Stream (TS). MPEG-2 facilitates insertions in the Transport Stream format via "splice points," which allow additional digital data, such as commercials, to be added into the stream. However, there is no mechanism available to add additional data in either MPEG-1 Systems Multiplex or MPEG-2 Program Stream.

The codecs for MPEG-1 Systems Multiplex and for MPEG-2 Program Stream are usually simpler than the codecs for MPEG-2 Transport Stream. There are many applications using either MPEG-1 Systems Multiplex or MPEG-2 Program Stream, and yet these applications are not able to insert additional data into the stream data. Consequently, there is a need for a method and system which allow insertion of additional data into a digital audio/video data stream. It would be desirable to allow the inserted data to possess attributes different from those attributes found in the original data stream. It would also be desirable to allow the original data stream to continue playing (i.e. being decoded) without interruption after the inserted data has been played.

SUMMARY OF THE INVENTION

Accordingly, the present invention is directed to a system, method, and computer readable medium for inserting additional data into a digital audio/visual data stream, when there are no defined splice points in the data stream. The inserted data may possess one or more attributes which differ from the original data stream.

The distributor of an audio/video asset provides control information, including an insert file, which contains a list of insert points in the data stream. Each insert point is preferably on a group of pictures boundary. The control information also includes reinitialization data for each insert point. The reinitialization data includes the information needed to reinitialize a decoder with the attributes of the original data stream after the inserted data is played.

The original audio/video data stream is played until an insert point is reached. The additional data is then played. Next, the reinitialization data for the insert point is played in order to reinitialize the decoder with the attributes of the original data stream. Finally, the original audio/video data stream is restarted at the insert point.

The method of the present invention may be implemented in an information handling system including a client and a server, or in any computer readable medium, including, but not limited to a videodisc, tape, diskette, or CD-ROM.

One advantage of the present invention is that additional data, such as commercials, may be inserted into a digital audio/video data stream at points other than predefined splice points. Another advantage of the present invention is that the additional data may possess one or more attributes which differ from attributes found in the original data stream. A further advantage of the present invention is that decoder attributes are reset appropriately to play the original data stream after the additional data has been played.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which:

FIG. 2 depicts the layout of an MPEG-2 Program Stream;

FIG. 3 depicts the layout of the pack header found in the MPEG-2 Program Stream of FIG. 2;

FIG. 4 depicts the layout of the system header found in the MPEG-2 Program Stream of FIG. 2;

FIG. 5 depicts the layout of the sequence header found in the video data portion of the MPEG-2 Program Stream of FIG. 2;

FIG. 6 depicts the layout of the Group of Pictures found in the video data portion of the MPEG-2 Program Stream of FIG. 2;

FIG. 9 is a flowchart illustrating the events which occur as the play list of FIG. 8 executes.

DETAILED DESCRIPTION OF A PREFERRED EMBODIMENT OF THE INVENTION

Figure 1:
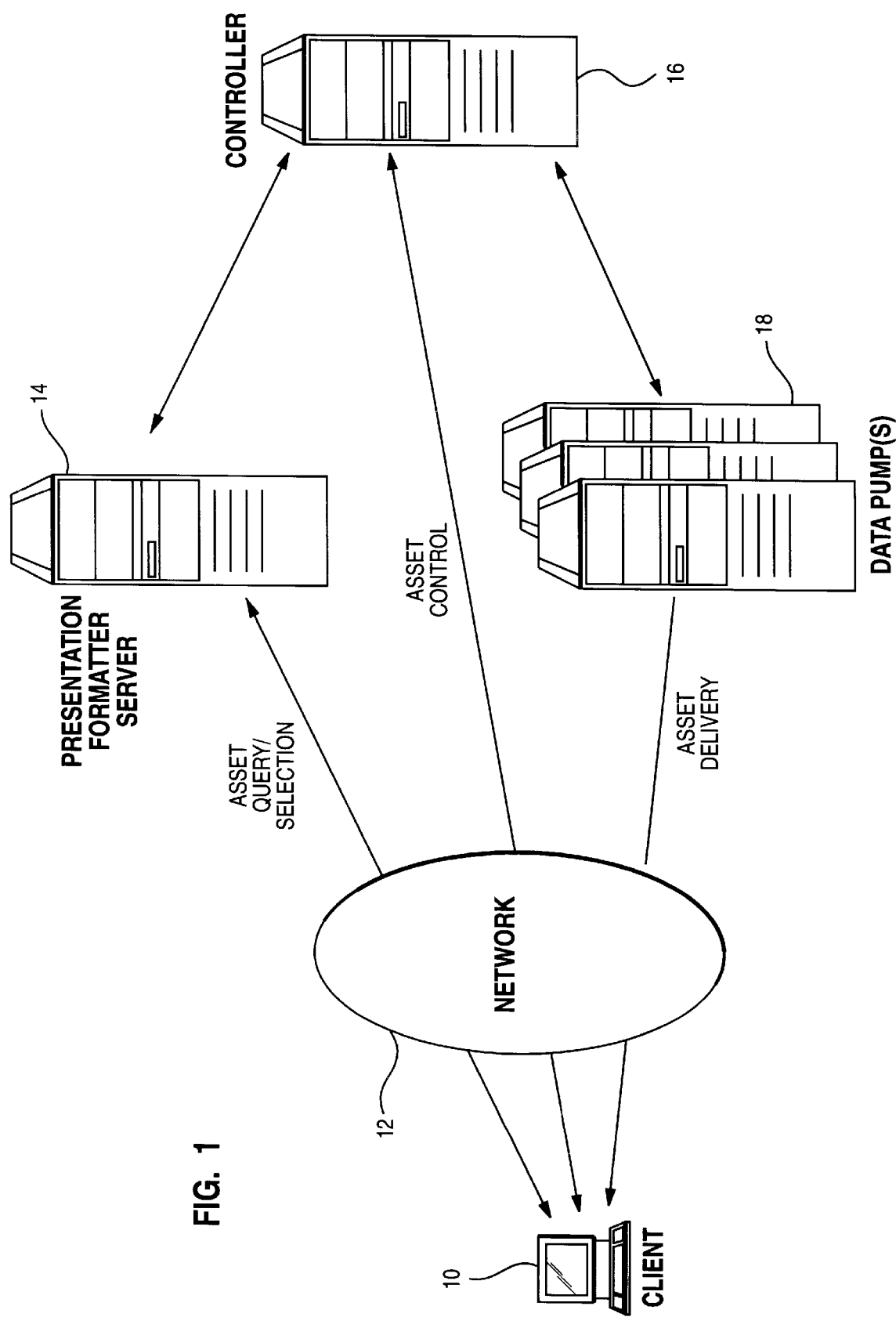
FIG. 1 is a diagram of a networked information handling system implementing the present invention.

The invention may be implemented on a variety of hardware platforms, including personal computers, workstations, mini-computers, and mainframe computers. Many of the steps of the method of the present invention may be advantageously implemented on parallel processors of various types. Referring now to FIG. 1, a typical configuration of a networked information handling system that may be used to practice the novel method of the present invention will be described. The illustrated components of FIG. 1 include client terminal 10 which is connected through network configuration 12 to presentation formatter server 14.

The server system, in addition to formatter server 14, further includes controller unit 16 and data pump 18 (which may actually include several data pumps) which are connected together to provide various multimedia functions including asset/query selection, asset control, and asset delivery, respectively, as illustrated. Formatter server 14 controls the way in which clients view information regarding available assets, and select specific assets for viewing. Data pump 18 stores multimedia files, also referred to as multimedia assets, and delivers assets to the client. Data pump 18 is arranged to play a file to a client across network 12 as shown. Controller 16 coordinates the various functions of the system, and typically includes an application server and a control server (not shown separately in FIG. 1). The main functional server units 14, 16, and 18 may be arranged in separate machines as illustrated, or may be combined in one server device. The multimedia server can store and deliver real-time, streamed compressed audio/video files to client 10.

Multimedia files, such as digital audio/video files, are typically stored in a file system in the server. Files may be stored in a variety of formats, some of which include splice points and some of which do not. When a user requests a particular file for playback on a client, the distributor of the file (e.g., a movie), may wish to insert commercials into the stream as it plays on the client machine.

The present invention is a method, system, and computer readable medium for inserting additional data, such as commercials, into a digital audio/video data stream. Many digital compression specifications, such as the MPEG-1 Systems Multiplex (SM) and the MPEG-2 Program Stream (PS), do not contain explicit splice points. Thus, it is difficult, if not impossible, to insert additional data, such as commercials into these types of audio/video data streams. The present invention allows data to be inserted into an audio/video data stream, while allowing the inserted data to possess attributes, or operating characteristics, different from those found in the original data stream. Attributes include such items as bit rate, play rate, resolution, aspect ratio, etc. After the inserted data is played, the original data stream continues to play.

The described embodiment explains how the present invention may be used to add commercials into an MPEG-2 Program Stream. However, the present invention is applicable to any type of digital data stream, including, but not limited to MPEG-1 Systems Multiplex, and other types of data streams, both with and without defined splice points. In a data stream which already contains defined splice points, the present invention allows additional data to be inserted at points other than the pre-existing splice points. Any type of additional data, including, but not limited to commercial data, may be inserted.

Referring now to FIG. 2, an MPEG-2 Program Stream layout will be described. To allow for proper decoding of an MPEG-2 Program Stream clip, the stream contains header information which allows the decoder to be properly initialized. Program Stream 50 contains Pack Header 52 and System Header 54. These headers are followed by the audio and video packets 56.

There is a single common system clock in most encoders, which is used to create time stamps. These time stamps indicate the correct presentation and decoding timing of both the audio and video data. The Program Stream contains the value of the system clock, referred to as the System Clock Reference (SCR). As shown in FIG. 3, Pack Header 52 contains, among other data, the System Clock Reference (SCR) 58. Pack Header 52 also contains start code 59, and the multiplexed bit rate, mux rate 60, of the clip.

Pack Header 52 is followed by System Header 54. Referring now to FIG. 4, the layout of System Header 54 will now be described. System Header 54 contains information regarding the audio/video packets in the stream, along with their respective stream IDs. A start code 62 indicates the start of the System Header. Start code 62 is followed by Header Length 64. Other information 66, not pertinent to the present invention, is also contained in System Header 54. Finally, System Header 54 contains the Stream IDs 68 of the audio/video packets in the stream.

The video data begins with a Sequence Header 70, as detailed in FIG. 5. Sequence Header 70 contains information required to decompress the video frames. Sequence Header 70 begins with Header Code 72, followed by Picture Size 74, Aspect Ratio 76, Picture Rate 78, and Video Rate 80. Additional information 82 required to decompress the video data is also included in Sequence Header 70.

A Group of Pictures (GOP) structure 84 follows Sequence Header 70. GOP 84 is described in detail in FIG. 6. Note that a Program Stream contains many GOP structures. Each GOP 84 contains a certain number of video frames. The exact number of video frames per GOP is determined when the movie is encoded. Each GOP 84 begins with Group Start Code 86, followed by Time Code 88. SMPTE (Society of Motion Picture and Television Engineers) Time Code 88 is of the form "hhmmssff," where hh is hours, mm is minutes, ss is seconds, and ff is frames. SMPTE Time Code 88 indicates the time and number of frames in the current GOP.

Figure 7:
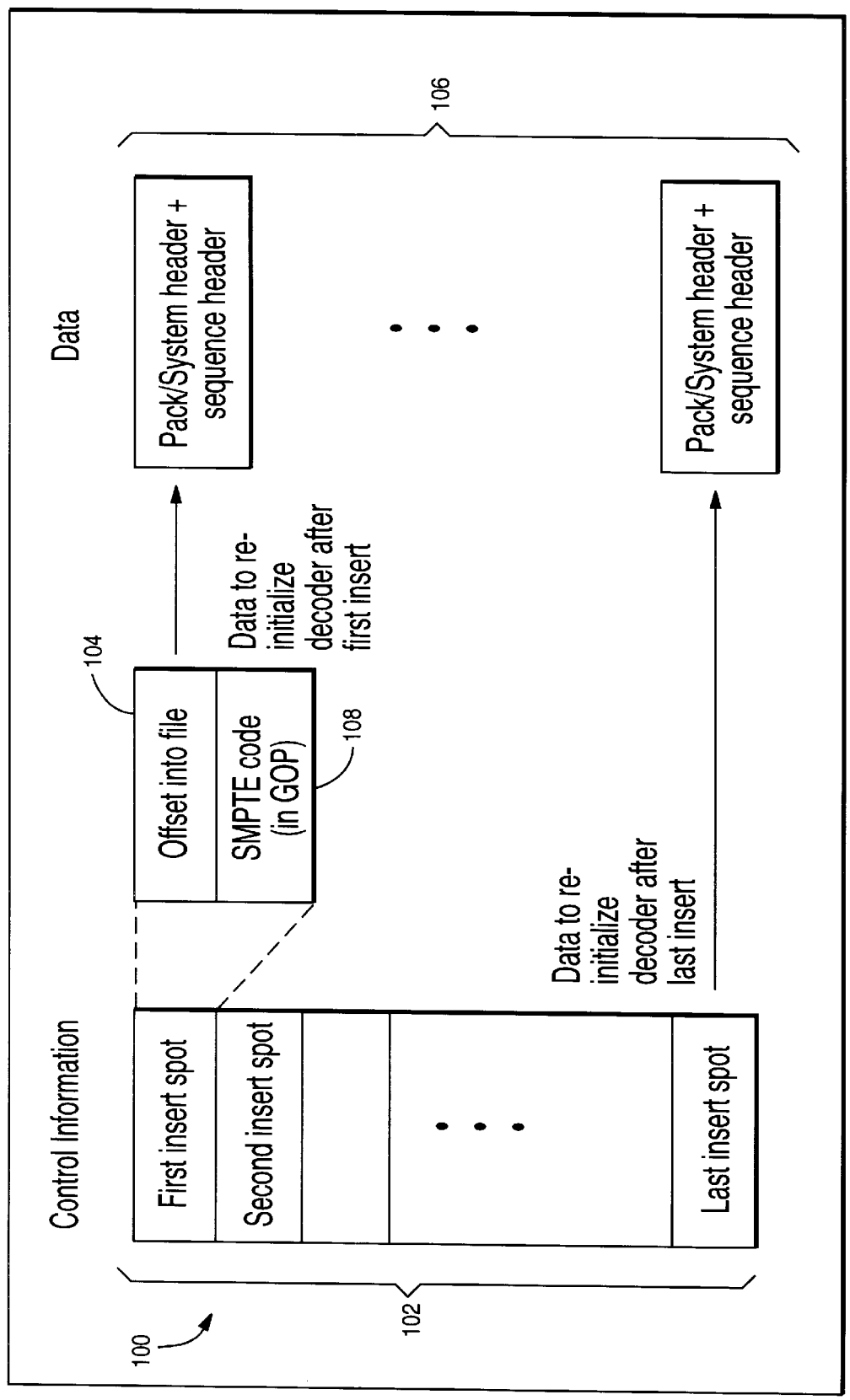
FIG. 7 is a block diagram of control information provided to allow insertion of additional digital data according to the teachings of the present invention.

To allow for insertion of commercial data, the distributor of a movie provides control information, including a commercial insert file, and one or more data files, along with the movie. Referring now to FIG. 7, a typical commercial insert file and data file will be described. Commercial insert file 100 contains a list 102 of commercial insert points, based on the SMPTE in a GOP. Note that an insert point also follows the SMPTE format of "hhmmssff." Each commercial insert point is preferably on a GOP boundary. Each item in list 102 contains an offset 104 into data file 106, and the SMPTE code 108 indicating where in the movie the commercial is to be inserted.

Data file 106 contains the Pack Header, the System Header, and the last valid Sequence Header before the GOP at the commercial insert spot. This data is used to re-initialize the decoder with the attributes of the movie after a commercial is played. By playing the appropriate data included in the data file, the codec in the client is re-initialized, or primed, with the correct attributes necessary to properly decode the movie. One skilled in the art will realize that the data contained in data file 106 may actually be contained in more than one data file.

When a client (e.g., client 10 in FIG. 1) requests an audio/video asset, a play list is typically constructed by a controller (e.g., controller 16 in FIG. 1). The play list is used to control which data is sent, and in what order the data is sent, from data pump 18 to client 10. The commercial insert file and the data files allow a play list to be constructed such that the movie is played with commercials. For an audio/video asset stored on a computer readable medium, such as a videodisc, the play list is stored along with the asset.

Figure 8:
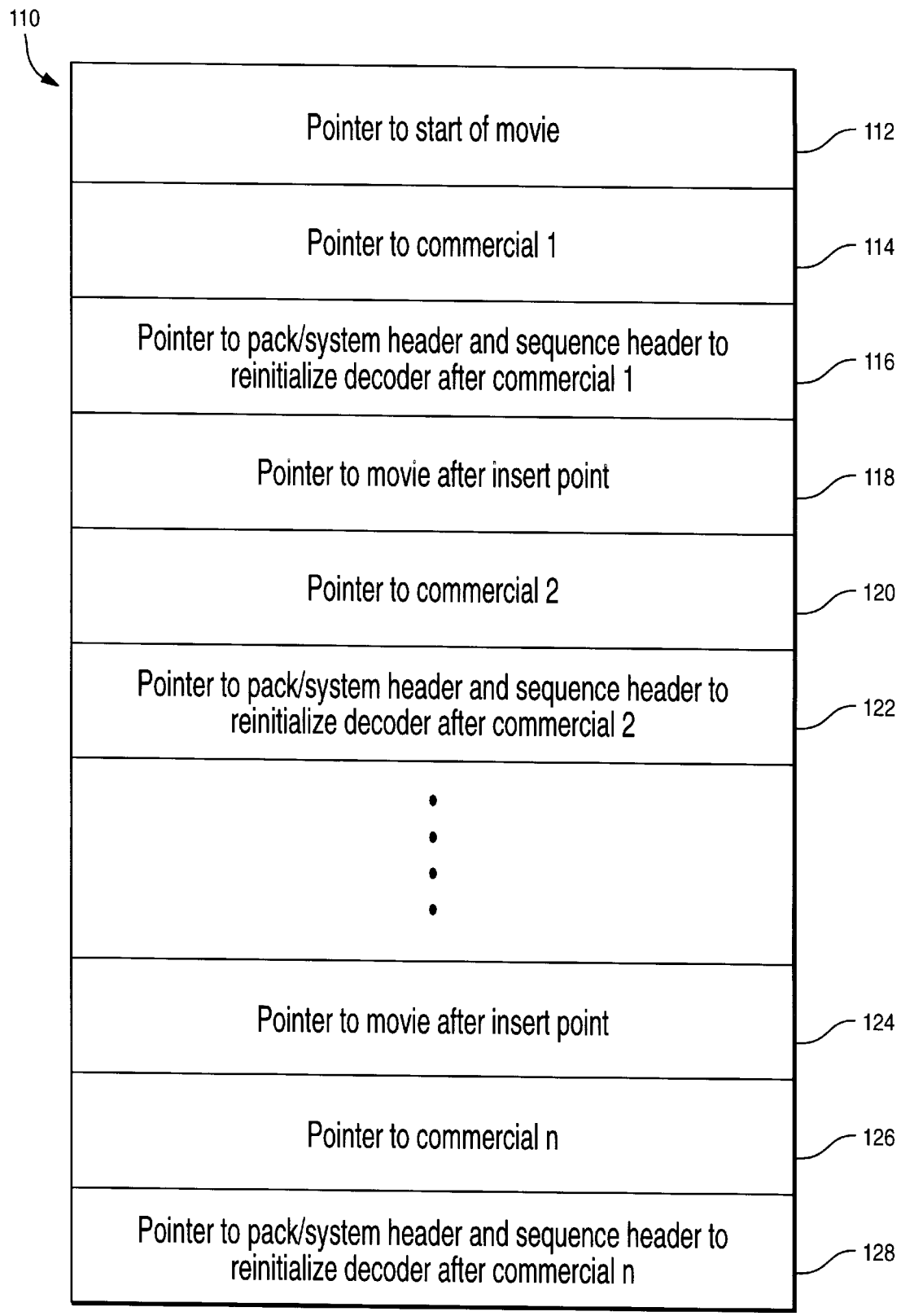
FIG. 8 is depicts a play list utilizing the data provided in FIG. 7.

An example of a play list is shown in FIG. 8. Play list 110 contains a series of pointers which control the actual playing of the movie and its commercials. Play list 110 contains a pointer 112 to the start of the requested audio/video asset (in this case a movie). Next, there is a pointer 114 to the first commercial, followed by a pointer 116 to the Pack/System Header and Sequence Header necessary to re-initialize the decoder after the first commercial plays. In this way, the first commercial may have different attributes than the movie itself. By playing the appropriate Pack/System Header and Sequence Header before restarting the movie, the decoder is re-initialized to the attributes of the movie. The play list next contains a pointer 118 to the movie after the insert point for the first commercial. Further commercials are also inserted, as shown in play list 110 by pointers 120 through 128.

Referring now to FIG. 9, a flow chart depicting the steps of the present invention will now be described. As shown in FIG. 9, the movie is started and played (step 140) until the first commercial insert spot is reached. The commercial insert spot is recognized through use of the commercial insert file. At this point, typically a GOP boundary, a commercial may be played (step 142). After the commercial is played, the appropriate reinitialization data from the data file is played (step 144). After the reinitialization data is played, the movie continues (step 146). The sequence of steps shown in FIG. 9 continues until the movie ends.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for inserting additional data into a digital audio/video data stream, comprising the steps of:

playing the audio/video data stream until an insertion point is reached;

playing the additional data;

playing a reinitialization sequence; and restarting the audit/video data stream at the insertion point.

2. A method according to claim 1, wherein the insertion point is at a group of pictures boundary.

3. A method according to claim 1, wherein said step of playing the additional data further comprises the step of obtaining a pointer to the additional data from a play list.

4. A method according to claim 1, wherein said step of playing a reinitialization sequence comprises the step of obtaining the reinitialization sequence from a file containing one or more reinitialization sequences.

5. A method according to claim 4, wherein there is one reinitialization sequence for each of a plurality of insertion points in the audio/video data stream.

6. A method according to claim 1, wherein the additional data and the audio/video data stream have one or more attributes which differ.

7. A method according to claim 1, wherein said step of playing a reinitialization sequence comprises the step of reinitializing a decoder with one or more attributes of the audio/video data stream.

8. An information handling system, comprising:

a client;

a decoder in said client for decompressing audio/video data streams;

a server;

means for sending an audio/visual data stream from said server to said client, wherein the audio/visual data stream is decompressed in said client by said decoder;

means for determining when an insertion point in the audio/video data stream is reached;

means for sending additional data from said server to said client when the insertion point is reached;

means for sending a reinitialization sequence from said server to said client; and means for restarting the audio/video data stream at the insertion point.

9. An information handling system according to claim 8, wherein the insertion point is at a group of pictures boundary.

10. An information handling system according to claim 8, wherein said means for determining when an insertion point is reached comprises a file of insertion points.

11. An information handling system according to claim 10, wherein said file contains one or more offsets into a data file containing one or more reinitialization sequences.

12. An information handling system according to claim 10, wherein said file contains one or more time codes in the audio/video data stream.

13. An information handling system according to claim 8, wherein said means for sending a reinitialization sequence further comprises:

a data file, comprising one or more reinitialization sequences; and means for determining which of the one or more reinitialization sequences to send.

14. An information handling system according to claim 8, wherein the additional data and the audio/video data stream have one or more attributes which differ.

15. An information handling system according to claim 8, wherein said means for sending a reinitialization sequence comprises means for reinitializing a decoder with one or more attributes of the audio/video data stream.

16. A computer readable medium for inserting additional data into a digital audio/video data stream, comprising:

means for playing the audio/visual data stream until an insertion point is reached;

means for playing the additional data when the insertion point is reached;

means for playing a reinitialization sequence; and means for restarting the audio/video data stream at the insertion point.

17. A computer readable medium according to claim 16, wherein the insertion point is at a group of pictures boundary.

18. A computer readable medium according to claim 16, further comprising a file containing a list of insertion points in the audio/video data stream.

19. A computer readable medium according to claim 18, wherein said file contains one or more offsets into a data file containing a plurality of reinitialization sequences.

20. A computer readable medium according to claim 18, wherein said file contains one or more time codes in the audio/visual data stream.

21. A computer readable medium according to claim 16, further comprising:

a data file, comprising one or more reinitialization sequences; and means for determining which of the one or more reinitialization sequences to play.

22. A computer readable medium according to claim 16, wherein the additional data and the audio/video data stream have one or more attributes which differ.

23. A computer readable medium according to claim 16, wherein said means for playing a reinitialization sequence comprises means for reinitializing a decoder with one or more attributes of the audio/video data stream.

24. A method for inserting commercials into an MPEG data stream, comprising the steps of:

reading a commercial insert file associated with the MPEG data stream, wherein the commercial insert file contains a plurality of potential insert points in the MPEG data stream, and wherein each potential insert point is associated with reinitialization data for the potential insert point;

selecting one or more of the potential insert points;

playing the MPEG data stream until a selected insert point is reached;

playing one or more commercials for the selected insert point;

playing the reinitialization data associated with the selected insert point; and restarting the MPEG data stream at the selected insert point.

25. A method according to claim 24, wherein each potential insert point is at a group of pictures boundary within the MPEG data stream.

26. A method according to claim 24, wherein the reinitialization data includes a pack header, a system header, and a sequence header for the MPEG data stream.

27. A method according to claim 26, wherein the sequence header is a last valid sequence header for the MPEG data stream before the potential insert point.

28. A method according to claim 24, wherein the MPEG data stream has one or more attributes which differ from at least one of the commercials.

29. A method according to claim 24, wherein said step of playing the reinitialization data associated with the selected insert point further comprises the step of reinitializing a decoder with one or more attributes of the MPEG data stream.

30. A method according to claim 24, wherein said steps of playing the MPEG data stream, playing one or more commercials, playing the reinitialization data, and restarting the MPEG data stream are controlled by a play list.

31. An information handling system, comprising:

a client;

a decoder in said client for decompressing MPEG data streams;

a server;

an MPEG data stream stored on said server;

means for sending the MPEG data stream from said server to said client, wherein the MPEG data stream is decompressed in said client by said decoder;

a commercial insert file associated with the MPEG data stream, wherein said commercial insert file contains a plurality of potential insert points in the MPEG data stream;

reinitialization data associated with each potential insert point;

means for selecting one or more of the potential insert points;

means for playing the MPEG data stream until a selected insert point is reached;

means for playing one or more commercials for the selected insert point;

means for playing the reinitialization data associated with the selected insert point; and means for restarting the MPEG data stream at the selected insert point.

32. An information handling system according to claim 31, wherein each potential insert point is at a group of pictures boundary within the MPEG data stream.

33. An information handling system according to claim 31, wherein the reinitialization data includes a pack header, a system header, and a sequence header for the MPEG data stream.

34. An information handling system according to claim 33, wherein the sequence header is a last valid sequence header for the MPEG data stream before the potential insert point.

35. An information handling system according to claim 31, wherein the MPEG data stream has one or more attributes which differ from at least one of the commercials.

36. An information handling system according to claim 31, wherein said means for playing the reinitialization data associated with the selected insert point further comprises means for reinitializing a decoder with one or more attributes of the MPEG data stream.

37. An information handling system according to claim 31, further comprising a play list, and wherein said means for playing the MPEG data stream, said means for playing one or more commercials, said means for playing the reinitialization data, and said means for restarting the MPEG data stream are controlled by said play list.

38. A computer readable medium for inserting commercials into an MPEG data stream, comprising:

means for reading a commercial insert file associated with the MPEG data stream, wherein the commercial insert file contains a plurality of potential insert points in the MPEG data stream, and wherein each potential insert point is associated with reinitialization data for the potential insert point;

means for selecting one or more of the potential insert points;

means for playing the MPEG data stream until a selected insert point is reached;

means for playing one or more commercials for the selected insert point;

means for playing the reinitialization data associated with the selected insert point; and means for restarting the MPEG data stream at the selected insert point.

39. A computer readable medium according to claim 38, wherein each potential insert point is at a group of pictures boundary within the MPEG data stream.

40. A computer readable medium according to claim 38, wherein the reinitialization data includes a pack header, a system header, and a sequence header for the MPEG data stream.

41. A computer readable medium according to claim 40, wherein the sequence header is a last valid sequence header for the MPEG data stream before the potential insert point.

42. A computer readable medium according to claim 38, wherein the MPEG data stream has one or more attributes which differ from at least one of the commercials.

43. A computer readable medium according to claim 38, wherein said means for playing the reinitialization data associated with the selected insert point further comprises means for reinitializing a decoder with one or more attributes of the MPEG data stream.

44. A computer readable medium according to claim 38, further comprising a play list, and wherein said means for playing the MPEG data stream, said means for playing one or more commercials, said means for playing the reinitialization data, and said means for restarting the MPEG data stream are controlled by said play list.

* * * * *